July 4, 1961

H. A. CARLSON ET AL 2,991,052

FUEL MIXTURE DISTRIBUTION CONTROL FOR
INTERNAL COMBUSTION ENGINES

Filed Aug. 4, 1958

INVENTORS
HAROLD A. CARLSON
ARTHUR F. GERST
BY
Laurence M. Goodridge
ATTORNEY

INVENTOR.
HAROLD A. CARLSON
ARTHUR F. GERST
BY

ATTORNEY

July 4, 1961 H. A. CARLSON ET AL 2,991,052
FUEL MIXTURE DISTRIBUTION CONTROL FOR
INTERNAL COMBUSTION ENGINES
Filed Aug. 4, 1958 4 Sheets-Sheet 3
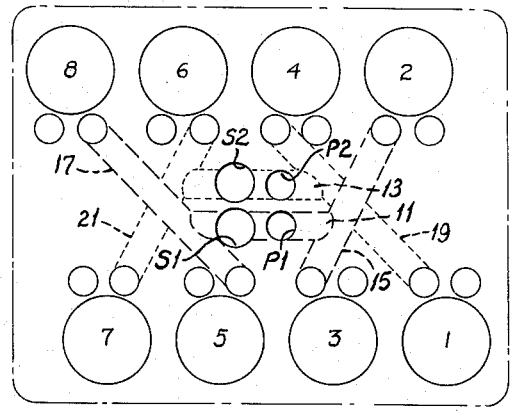
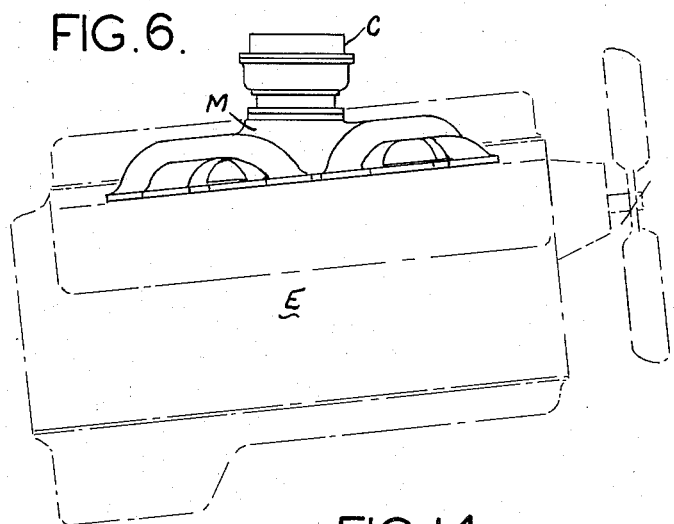
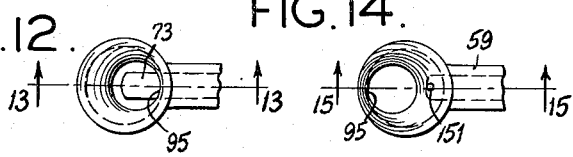
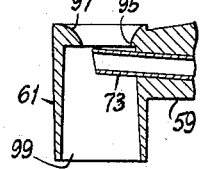
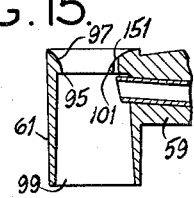
INVENTOR.
HAROLD A. CARLSON
ARTHUR F. GERST
BY
ATTORNEY July 4, 1961

H. A. CARLSON ET AL 2,991,052

FUEL MIXTURE DISTRIBUTION CONTROL FOR
INTERNAL COMBUSTION ENGINES

Filed Aug. 4, 1958

INVENTORS
HAROLD A. CARLSON
ARTHUR F. GERST

BY
*Lawrence M. Goodridge*

ATTORNEY

United States Patent Office 2,991,052
Patented July 4, 1961

2,991,052
FUEL MIXTURE DISTRIBUTION CONTROL FOR INTERNAL COMBUSTION ENGINES
Harold A. Carlson, Brentwood, and Arthur F. Gerst, St. Louis, Mo., assignors to ACF Industries, Incorporated, New York, N.Y., a corporation of New Jersey
Filed Aug. 4, 1958, Ser. No. 752,997
20 Claims. (Cl. 261—23)

This invention relates to carburetors and more particularly to carburetors for multi-cylinder internal combustion engines of the automotive type.

The invention is particularly concerned with the problem of obtaining uniform distribution of air/fuel mixture to the cylinders of an automotive engine. By "uniform distribution" is meant the distribution to all the cylinders of substantially the same quality of mixture. This problem arises in cases where the passage from the carburetor through the intake manifold to certain cylinders of the engine is freer than the passage for other cylinders of the engine, due to such factors as mounting of the carburetor in a position offset from the center of the engine, or inclination of the engine downward from front to rear, or both. Unless compensation is made, the distribution of mixture to the various cylinders is undesirably nonuniform, those cylinders to which the passage is freer receiving a relatively richer mixture than the others. The problem is complicated, in an installation such as on a V-8 engine including a multi-stage carburetor, such as a four-barrel carburetor having two primary barrels and two secondary barrels, in that the two primary barrels may be located toward the front end of the engine and the two secondary barrels toward the rear end of the engine, with the result that the primary barrels are closer to the forward cylinders than to the rearward cylinders, and the secondary barrels are closer to the rearward cylinders than to the forward cylinders. The problem is particularly acute in instances where the secondary barrels are larger than the primary barrels, since, under these circumstances, when the secondary barrels come into operation, the difference between the quality of mixture supplied to the rearward cylinders and the quality of mixture supplied to the forward cylinders is accentuated.

Accordingly, it is an object of this invention to provide a carburetor so constructed as to tend to compensate, within the carburetor itself, for differences in the freedom of passage of mixture through the intake manifold to the various cylinders of the engine in such manner as to provide for more uniform distribution of mixture to the cylinders.

It will be understood that a carburetor includes one or more mixture conduits connected to the manifold for flow of air therethrough to the engine, and means for supplying fuel to the mixture conduit for admixture therein with the air. The mixture flows laterally in one direction from the mixture conduit through the mixture conduit to a first group of engine cylinders, and laterally in another direction from the mixture conduit through the manifold to a second group of cylinders. Assuming that the passage to the second group of cylinders is freer than the passage through the manifold to the first group, which would otherwise mean that the second group would tend to be supplied with richer mixture than the first group, this invention attains the stated object by providing means in the mixture conduit for intensifying the richness of the mixture issuing from the mixture conduit at the side thereof toward the passage to the first group of cylinders. Thus, a somewhat richer mixture is delivered to the manifold for flow in the one direction to the first group than is delivered to the manifold for flow in the other direction to the second group to compensate for the difference in the freedom of passage to the two groups. Thus, in the above-noted case of a four-barrel carburetor on a V-8 engine, means may be provided in the primary barrels for intensifying the richness of the mixture at the rearward side of these barrels, and means may be provided in the secondary barrels for intensifying the richness of the mixture at the forward sides of these barrels. More specifically, the intensification of mixture richness is attained by providing in each barrel a boost venturi having an eccentric throat, the throat being offset toward that side of the boost venturi where intensification is desired. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a plan view of a four-barrel carburetor in which the invention is incorporated, parts being broken away;

FIGS. 2, 3 and 4 are vertical cross sections taken on lines 2—2, 3—3 and 4—4 of FIG. 1;

FIG. 5 is a diagrammatic view illustrating the cylinder and manifold arrangement of a V-8 engine on which the carburetor is used;

FIG. 6 is a side elevation illustrating the engine, manifold and carburetor;

FIG. 12 is a plan view illustrating a modification;

FIG. 13 is a vertical cross section taken on line 13—13 of FIG. 12;

FIG. 14 is a plan view illustrating another modification; and,

FIG. 15 is a vertical cross section taken on line 15—15 of FIG. 14.

Corresponding reference characters indicate corresponding parts throughout the several views of the drawings.

Figure 2:
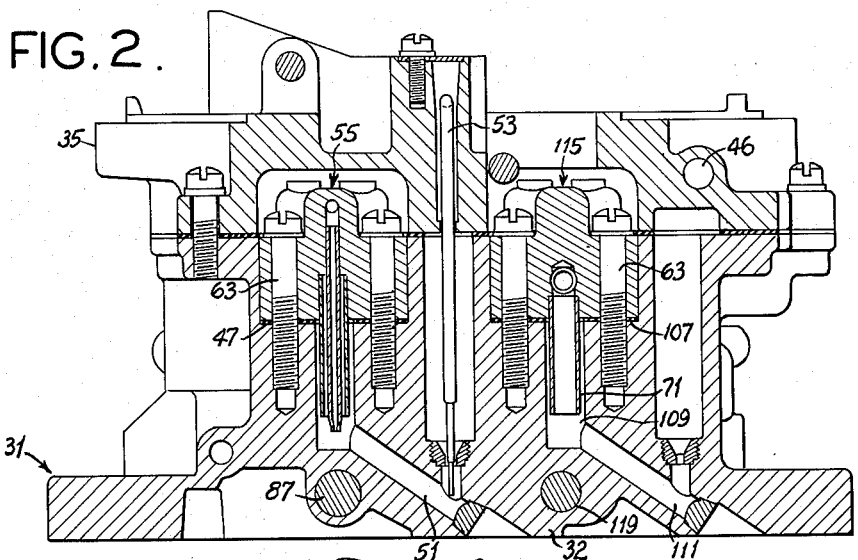

Referring first to FIGS. 5 and 6 of the drawings, there is indicated at E a typical V-8 automotive engine. As appears in FIG. 6, the engine is mounted in the vehicle inclined downward from front to rear. As will be understood, the cylinders of this engine are arranged in two banks of four cylinders each. The four cylinders in the right bank (as viewed looking toward the front end of the engine) are numbered 1, 3, 5 and 7 from to rear. The four cylinders in the left bank are numbered 2, 4, 6 and 8 from front to rear. The intake manifold of the engine is generally designated M. The carburetor for the engine is generally designated C. As illustrated, the carburetor is a four-barrel carburetor, having two primary barrels P1 and P2, and two secondary barrels S1 and S2 (see FIG. 5). The secondary barrels are shown as larger than the primaries. The carburetor is mounted on the intake manifold in vertical position located generally centrally of the length of the engine, with the primary barrels P1 and P2 toward the front and secondary barrels S1 and S2 toward the rear.

Barrels P1 and S1 are in communication with a right-hand lengthwise runner 11 in the manifold, and barrels P2 and S2 are in communication with a left-hand lengthwise runner 13 in the manifold. Runner 11 extends forward to a diagonal runner 15 in the manifold which supplies cylinders 2 and 3, and rearward to a diagonal runner 17 which supplies cylinders 5 and 8. Runner 13 extends forward to a diagonal runner 19 which supplies cylinders 1 and 4, and rearward to a diagonal runner 21 which supplies cylinders 6 and 7. With this runner arrangement, cylinders 1, 4, 6 and 7 are supplied by the left-hand barrels P2 and S2, and cylinders 2, 3, 5 and 8 are supplied by the right-hand barrels P1 and S1. Thus, with a cylinder firing order such as 1, 2, 7, 8, 4, 5, 6, 3, successively fired cylinders are supplied from alternate sides of the carburetor, 1 being supplied from the left side, 2 from the right, 7 from the left, 8 from the right, etc.

It will be observed that the passage through the manifold from primary barrel P1 to cylinder 3 is shorter than to cylinder 5. The passage from P1 to cylinder 2 is shorter than to cylinder 8. The passage from P2 to cylinder 4 is shorter than to cylinder 6 and the passage from P2 to cylinder 1 is shorter than to cylinder 7. Conversely, the passage from S1 to cylinder 3 is longer than to cylinder 5 and the passage from S1 to cylinder 2 is longer than to cylinder 8. The passage from S2 to cylinder 4 is longer than to cylinder 6 and the passage from S2 to cylinder 1 is longer than to cylinder 7. Also, the passage from P1, P2, S1 and S2 through runners 11 and 13 to cylinders 1, 2, 3 and 4 is upward, and to cylinders 5, 6, 7 and 8 is downward. Accordingly, the flow from the secondaries S1 and S2 to cylinders 5, 6, 7 and 8 is freer than to cylinders 1, 2, 3 and 4. While the freedom of the passage from primaries P1 and P2 to cylinders 1, 2, 3 and 4 may be reduced to some extent by the fact that the flow through runners 11 and 13 to these cylinders is upward, the passage from P1 and P2 to cylinders 1, 2, 3 and 4 is usually freer than to cylinders 5, 6, 7 and 8. Accordingly, without the compensation provided for by this invention in the carburetor C, when the primaries P1 and P2 alone are in operation, they would tend to supply a richer mixture to cylinders 1, 2, 3 and 4 than to cylinders 5, 6, 7 and 8, and when the secondaries S1 and S2 are in operation, they would tend to supply a richer mixture to cylinders 5, 6, 7 and 8 than to cylinders 1, 2, 3 and 4. The latter condition is accentuated by the relatively large size of secondaries S1 and S2.

In accordance with this invention, the carburetor C is constructed so as to compensate within itself for the differences in freedom of flow of mixture to the various cylinders (due to differences in length of manifold passage to the different cylinders, manifold inclination, and size of the secondaries), by providing for intensification of the richness of the mixture in primary barrels P1 and P2 at the rearward side of these barrels, and for intensification of the richness of the mixture in secondary barrels S1 and S2 at the forward sides of these barrels. As a result, the mixture supplied by the primary barrels rearward through runners 11 and 13 is richer than that supplied by the primary barrels forward through these runners, thereby compensating for the effect of greater freedom of passage from the primary barrels to cylinders 1, 2, 3 and 4, and the mixture supplied by the secondary barrels forward through runners 11 and 13 is richer than that supplied rearward through these runners, thereby compensating for the effect of greater freedom of passage from the secondary barrels to cylinders 5, 6, 7 and 8.

The carburetor C, as illustrated in FIGS. 1–4, comprises a main body casting 31 formed to provide the usual throttle body section 32 and the usual float bowl section 33 on the throttle body section. Secured to the top of the casting 31 is the usual float bowl cover 35 formed to provide the usual air horn 37. Casting 31 is formed to provide the primary barrels P1 and P2 which are located side-by-side toward one side of the carburetor (which is its forward side as related to FIGS. 5 and 6), and to provide the secondary barrels S1 and S2 which are located side-by-side toward the other side of the carburetor (its rearward side as related to FIGS. 5 and 6). Each barrel is formed to constitute a main venturi. The primary barrels are separated from the secondary barrels by a partition 39, and the air horn has a partition 41 coplanar with partition 39. Casting 31 is formed to provide two float bowls, one at each end of the carburetor, one of these being designated 43 and the other 45 in FIG. 3. Bowl 43 supplies primary P1 and secondary S1; bowl 45 supplies primary P2 and secondary S2.

Figure 3:
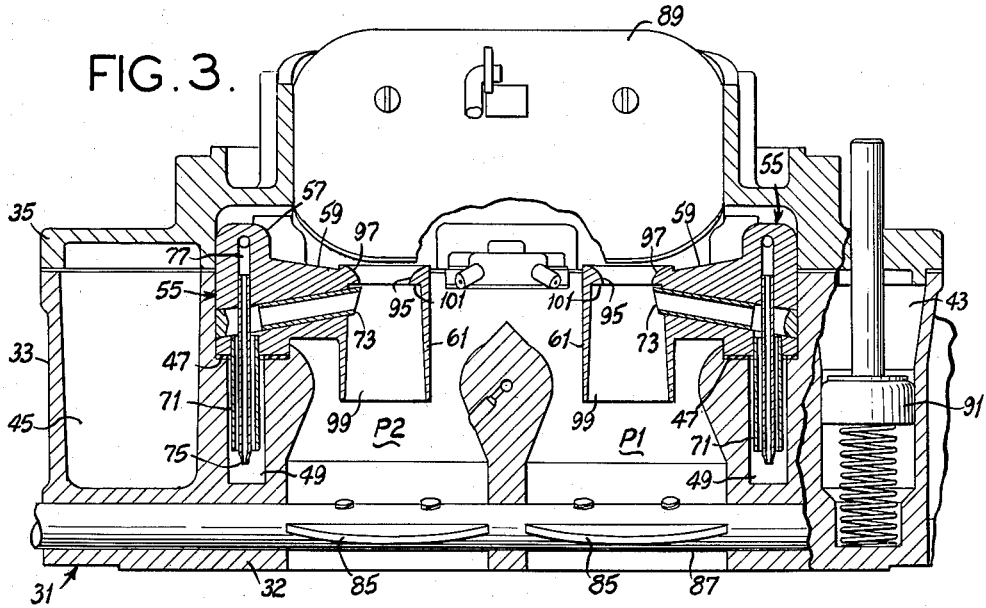
Figure 4:
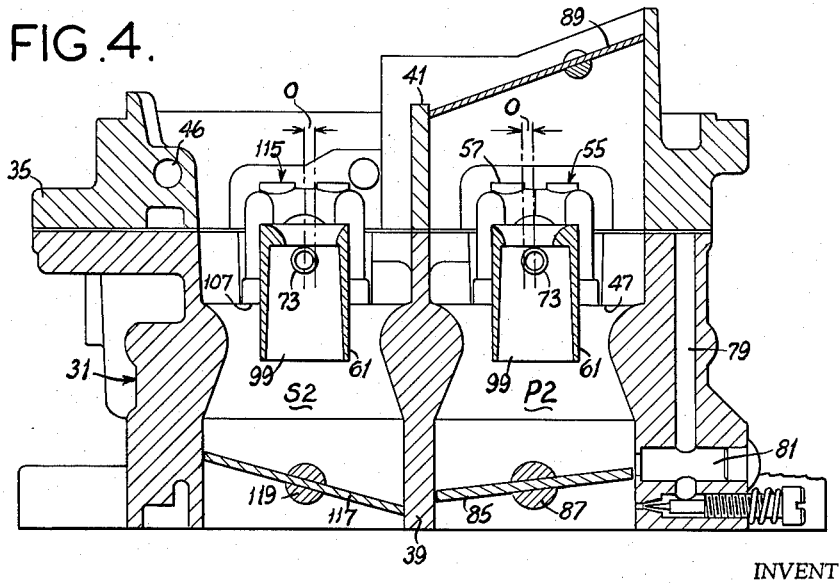
Figure 7:
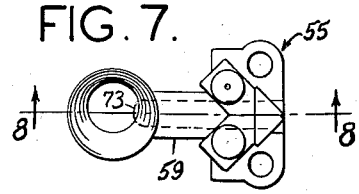
FIG. 7 is a plan view of a nozzle body per se of the carburetor of FIGURE 1.
Figure 8:
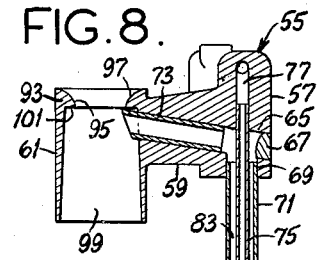
FIG. 8 is a vertical section taken on line 8—8 of FIG. 7.

It will be understood that the two float bowls are supplied with fuel via a fuel inlet and a fuel passage such as indicated at 46 in the float bowl cover in FIGS. 2 and 4 under control of the usual float valves (not shown), these valves functioning to maintain a constant level of fuel in the bowls. The systems whereby bowl 43 supplies barrels P1 and S1 and whereby bowl 45 supplies barrels P2 and S2 are identical. As shown in FIG. 3, each of barrels P1 and P2 has an upwardly facing shoulder 47 at the side thereof toward the respective float bowl 43 or 45. Extending down from each shoulder is a vertical well 49. Casting 31 is formed with passages such as indicated at 51 in FIG. 2 providing for communication from the bowls to the bottoms of the wells. Flow from each bowl to this passage is under control of the usual metering rod 53 as appears in FIG. 2. Supported on each shoulder 47 is a nozzle body 55 (illustrated per se in FIGS. 7 and 8) formed to provide a head 57, an arm 59 extending from the head, and a boost venturi 61 at the outer end of the arm. The head is secured on shoulder 47 as by screws 63 (see FIG. 2). A hole 65 is drilled through the head 57 and the arm 59 from the outside of the head to open into the boost venturi 61. The outer end of this hole is closed as by a welch plug 67. The hole is angled upward from the outside of the head to the boost venturi.

A hole 69 is drilled up from the bottom of the head to an intersection with angled hole 65. A fuel tube 71 has its upper end pressed in hole 69 and extends down into the well 49. A nozzle tube 73 is pressed into angled hole 65 and extends from hole 69 through the arm into the boost venturi 61. For supplying fuel for idling to each primary barrel, an idle fuel tube 75 is provided extending down within fuel tube 71 from an idle fuel passage 77 formed in the head. Passage 77 communicates with a passage 79 (see FIG. 4) formed in casting 31 extending to the usual idle port 81 for the primary barrel. The space 83 between tubes 71 and 75 and tube 73 provide a high speed fuel passage from the well 49 to the boost venturi 61. The idle tube 75 is part of a low speed circuit for delivering fuel at low speed operation to the idle port 81 for the primary barrel. This low speed circuit, as will be understood, may include the usual economizer and air bleed. Each primary barrel has the usual primary throttle valve 85 at its lower end, the two primary throttle valves being fixed on the usual primary throttle shaft 87. The usual choke valve for the primary barrels is indicated at 89. The usual accelerator pump is indicated at 91.

Figure 1:
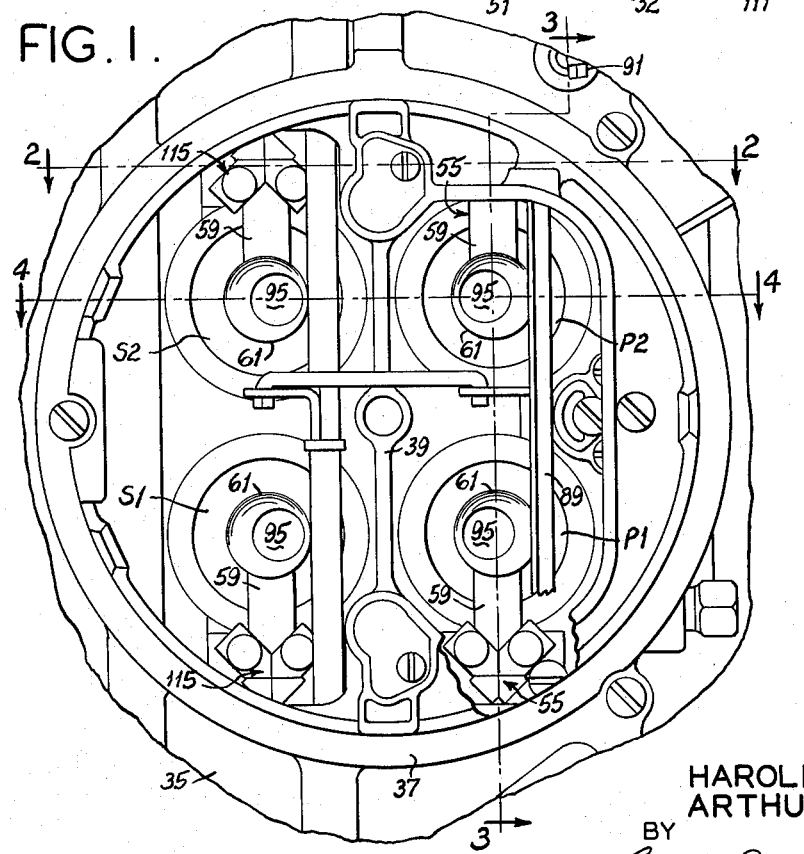

In accordance with this invention, the boost venturi 61 in each primary barrel is of special form to provide for intensification of the richness of the mixture in these barrels at the rearward sides of these barrels (their left sides as viewed in FIGS. 1, 4 and 5). Each primary boost venturi is formed with a restriction 93 adjacent its upper end, which is its entrance end, defining a circular throat 95. Leading down to the throat is the relatively short flaring boost venturi entrance passage 97, which is of rounded form converging in downward direction to the throat 95. Extending down from the throat to the lower end of the boost venturi is the relatively long venturi diffusion passage 99. This is of slightly flaring conical form divergent in downward direction from the throat 95. The upper end of diffusion passage 99 is of larger diameter than the throat 95 so that there is a horizontal annular shoulder 101 at the upper end of the diffusion passage. The nozzle tube 73 extends into the boost venturi 61 below this shoulder 101, with its inner end adjacent the throat. The diffusion passage is concentric with the barrel. The throat, instead of being concentric with diffusion passage 99, is eccentric in relation to passage 99, being offset laterally from the vertical central axis of the passage 99 toward the rearward side (the left side) of the boost venturi 61, as appears in FIGS. 1 and 4, the offset being indicated at O in FIG. 4.

As shown in FIGS. 2 and 4, each secondary barrel S1 and S2 is formed with a shoulder 107 like the shoulders 47 in the primary barrels. Extending down from each shoulder 107 is a well 109 like well 49. Casting 31 is formed with passages such as indicated at 111 in FIG. 2 providing for communication from the bowls to the bottoms of wells 109. Metering rods are not used for the secondaries. Supported on each shoulder 107 is a nozzle body 115 which corresponds to nozzle body 55 used in the primaries except that idle fuel tube 75 and idle fuel passage 77 are omitted since fuel for idling is not supplied to the secondaries, and except that the throat 95 of the boost venturi 61 on each body 115 is offset toward the forward side (the right side as viewed in FIGS. 1 and 4) instead of toward the rearward side as in the case of the primary boost venturis. Since nozzle body 115 otherwise corresponds to nozzle body 55, the same reference characters are used for the parts of body 115 as for body 55. Thus, as appears in FIG. 1, throats 95 of the boost venturis 61 in the secondary barrels S1 and S2 are offset laterally from the vertical central axes of the diffusion passages 99 of the secondary boost venturis toward the forward side (the right side) as appears in FIGS. 1 and 4, the offset being indicated at O in FIG. 4. Each secondary barrel has the usual secondary throttle valve 117 at its lower end, the two secondary throttle valves being fixed on the usual secondary throttle shaft 119 (see FIG. 4).

With the eccentric boost venturi throats 95 offset in the directions as above described, the richness of the mixture issuing from the primary barrels P1 and P2 is intensified at the rearward side of the primary barrels (their left side as viewed in FIGS. 1, 4 and 5), and the richness of the mixture issuing from the secondary barrels S1 and S2 is intensified at the forward side of the secondary barrels (their right side as viewed in FIGS. 1, 4 and 5). This tends to compensate for the factors of freer forward flow than rearward flow from the primaries and freer rearward flow than forward flow from the secondaries, and the relatively large size of the secondaries. As to any one of the barrels, the richness of the mixture is intensified at the side of the barrel toward which the throat 95 of the boost venturi 61 is offset by reason of the fact that the offset produces a cross-sectional stratification of the mixture in the diffusion passage 99 of the boost venturi which carries through to the lower end of the main venturi, this stratification being such that there is more fuel in the air in the region directly below the throat than in the region offset from the throat.

Figure 9:
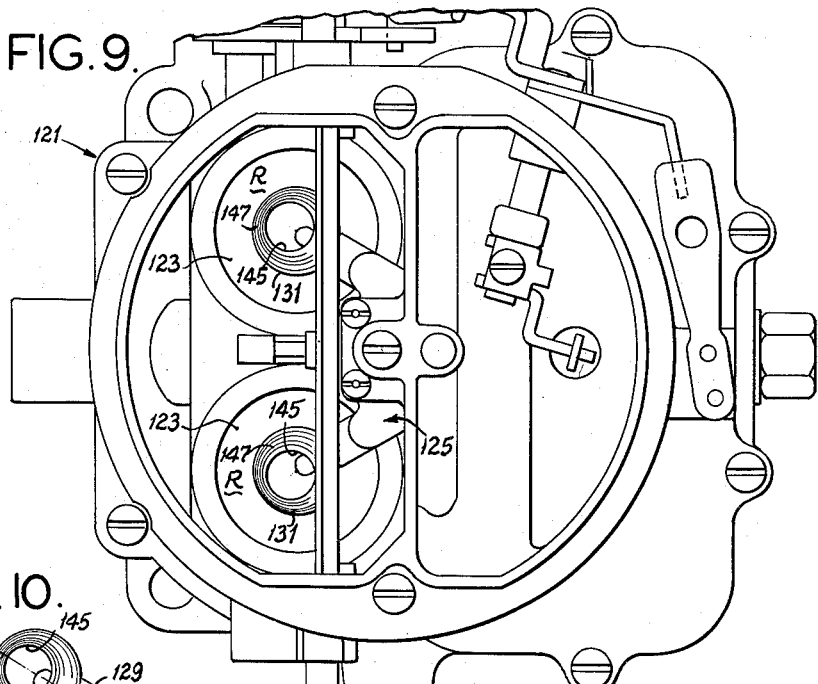
FIG. 9 is a plan view of a dual carburetor in which the invention is incorporated, parts being broken away.
Figure 10:
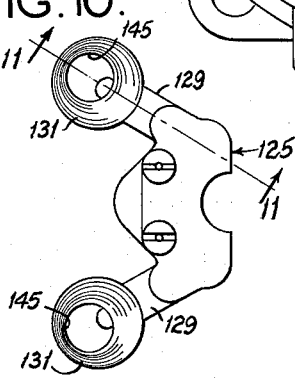
FIG. 10 is a plan view of a nozzle cluster per se used in the FIG. 9 carburetor.
Figure 11:
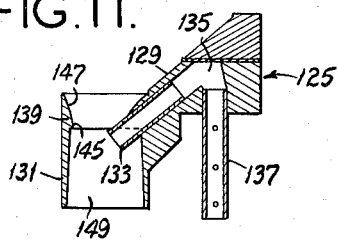
FIG. 11 is a vertical cross section taken on line 11—11 of FIG. 10.

FIG. 9 illustrates a dual carburetor 121 in which the invention is incorporated. This carburetor has two barrels each designated 123, each of which is a primary barrel. This type of carburetor does not have any secondary barrels. As will be understood, each primary barrel 123 is formed as a main venturi. The carburetor has a boost venturi cluster generally designated 125 (see FIGS. 10 and 11), comprising a head 127 having two arms each designated 129 angled out into the two barrels 123, each arm having a boost venturi 131 at its outer end. A nozzle tube 133 extends through each arm 129 into the boost venturi 131 from a fuel passage 135, and there is a fuel tube 137 which extends down from passage 135 into the usual fuel well (not shown). Each boost venturi 131 is formed with a restriction 139 adjacent its upper end, which is its entrance end, defining a circular throat 145. Leading down to the throat is the relatively short flaring boost venturi entrance passage 147, which converges to the throat. Extending down from the throat to the lower end of the boost venturi is the relatively long venturi diffusion passage 149. As before, this is of slightly flaring conical form divergent in downward direction from the throat. The diffusion passages 149 are concentric with the barrels 123. The throats 145, instead of being concentric with the diffusion passages 149, are eccentric in relation thereto, being shown as offset outward from the vertical central axes of the diffusion passages in the planes of the arms 129. As a result, the richness of the mixture issuing from the barrels is intensified in the regions indicated at R in FIG. 9, as is desirable for obtaining more uniform distribution of mixture in certain installations.

In the construction shown in FIGS 1–4, 7 and 8, the boost venturi throats are offset to one side of the nozzle body arms. In the construction shown in FIGS. 9–11, the boost venturi throats are offset outwards from the nozzle body arms in the planes of the arms. It will be understood that the offset of the throat may be in any appropriate direction for mixture enrichment at the appropriate side of the barrel. For example, FIGS. 12 and 13 show the boost venturi throat 95 offset toward the nozzle body arm 59 in the plane of the arm. FIGS. 12 and 13 also show the nozzle tube 73 extending part way across the throat area for purposes of varying the cross-sectional stratification of mixture. FIGS. 14 and 15 show the boost venturi throat 95 offset away from the nozzle body arm, with the tip of nozzle 73 shrouded by the shoulder 101, and with a hole 151 through the shoulder adjacent the tip of the nozzle for varying the cross-sectional stratification of mixture.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In a system for suppling air/fuel mixture to the cylinders of a multi-cylinder internal combustion engine, said system comprising an intake manifold for the engine, a carburetor having a mixture conduit connected to the manifold intermediate the ends thereof for flow of air therethrough for distribution by said manifold to the engine cylinders and means for supplying fuel to said mixture conduit for admixture therein with the air, the mixture flowing in one direction from the carburetor through said manifold to a first group of cylinders and in another direction from the carburetor through said manifold to a second group of cylinders, the passage through the manifold to the second group being freer than the passage through the manifold to the first group, and means in said mixture conduit for cross-sectional stratification therein of the mixture issuing from the carburetor with the mixture at the side of the mixture conduit toward the passage to said first group of cylinders richer than the mixture at the side of the mixture conduit toward the passage to the second group of cylinders.

2. In a system for supplying air/fuel mixture to the cylinders of a multi-cylinder internal combustion engine, said system comprising an intake manifold for the engine, a carburetor having a mixture conduit connected to the manifold intermediate the ends thereof for flow of air therethrough for distribution by said manifold to the engine cylinders and means for supplying fuel to said mixture conduit for admixture therein with the air, the mixture flowing in one direction from the carburetor through said manifold to a first group of cylinders and in another direction from the carburetor through said manifold to a second group of cylinders, the passage through the manifold to the second group being freer than the passage through the manifold to the first group, and means in said mixture conduit providing a throat adjacent one end thereof constituting its entrance end, said throat being eccentric in relation to the other end of the conduit and offset in the direction toward the passage to said first group of cylinders for intensifying the richness of the mixture issuing from the mixture conduit at the side thereof toward the passage to said first group of cylinders.

3. In a system for supplying air/fuel mixture to the cylinders of a multi-cylinder internal combustion engine, said system comprising an intake manifold for the engine, a carburetor having a venturi connected to the manifold intermediate the ends thereof for flow of air therethrough for distribution by said manifold to the engine cylinders, means for supplying fuel to said venturi for admixture therein with the air, the mixture flowing in one direction from the carburetor through said manifold to a first group of cylinders and in another direction from the carburetor through said manifold to a second group of cylinders, the passage through the manifold to the second group being freer than the passage through the manifold to the first group, said venturi having a throat adjacent one end thereof constituting its entrance end, and a diffusion passage from the throat to its other end, said throat being eccentric in relation to said diffusion passage and offset in the direction toward the passage to said first group of cylinders for intensifying the richness of the mixture issuing from the venturi at the side thereof toward the passage to said first group of cylinders.

4. In a system for supplying air/fuel mixture to the cylinders of a multi-cylinder internal combustion engine, said system comprising an intake manifold for the engine, a carburetor having a main venturi connected to the manifold intermediate the ends thereof for flow of air therethrough for distribution by said manifold to the engine cylinder, a boost venturi for the main venturi, means for supplying fuel to said boost venturi for admixture therein with the air, the mixture flowing in one direction from said main venturi through said manifold to a first group of cylinders and in another direction from said main venturi through said manifold to a second group of cylinders, the passage through the manifold to the second group being freer than the passage through the manifold to the first group, said boost venturi having a throat adjacent one end thereof constituting its entrance end, said throat being eccentric in relation to the other end of the boost venturi and offset in the direction toward the passage to said first group of cylinders for intensifying the richness of the mixture issuing from the main venturi at the side thereof toward the passage to said first group of cylinders.

5. In a system for supplying air/fuel mixture to the cylinders of a multi-cylinder internal combustion engine, said system comprising an intake manifold for the engine, a carburetor having a main venturi connected to the manifold intermediate the ends thereof for flow of air therethrough for distribution by said manifold to the engine cylinders, a boost venturi for the main venturi, means for supplying fuel to said boost venturi for admixture therein with the air, the mixture flowing in one direction from said main venturi through said manifold to a first group of cylinders and in another direction from said main venturi through said manifold to a second group of cylinders, the passage through the manifold to the second group being freer than the passage through the manifold to the first group, said boost venturi having a throat adjacent one end thereof constituting its entrance end and a diffusion passage from the throat to its other end, said throat being eccentric in relation to said diffusion passage and offset in the direction toward the passage to said first group of cylinders for intensifying the richness of the mixture issuing from the main venturi at the side thereof toward the passage to said first group of cylinders.

6. In a system for supplying air/fuel mixture to the cylinders of a V-8 internal combustion engine, said system comprising an intake manifold for the engine, and a four-barrel carburetor having two primary barrels located side-by-side toward one end of the engine and two secondary barrels located side-by-side toward the other end of the engine and connected to the manifold for flow of air therethrough to the cylinders, means for supplying fuel to each barrel for admixture therein with the air, means in the primary barrels for intensifying the richness of the mixture issuing therefrom at the side thereof toward said other end of the engine, and means in the secondary barrels for intensifying the richness of the mixture issuing therefrom at the side thereof toward said one end of the engine.

7. In a system for supplying air/fuel mixture to the cylinders of a V-8 internal combustion engine, said system comprising an intake manifold for the engine, and a four-barrel carburetor having two primary barrels located side-by-side toward one end of the engine and two secondary barrels located side-by-side toward the other end of the engine and connected to the manifold for flow of air therethrough to the cylinders, means for supplying fuel to each barrel for admixture therein with the air, means in each primary barrel providing a throat adjacent one end thereof constituting its entrance end, each throat being eccentric in relation to the other end of the primary barrel and offset in the direction toward said other end of the engine, and means in each secondary barrel providing a throat adjacent one end therof constituting its entrance end, each of the latter throats being eccentric in relation to the other end of the secondary barrel and offset in the direction toward said one end of the engine.

8. In a system for supplying air/fuel mixture to the cylinders of a V-8 internal combustion engine, said system comprising an intake manifold for the engine, and a four-barrel carburetor having two primary barrels located side-by-side toward one end of the engine and two secondary barrels located side-by-side toward the other end of the engine and connected to the manifold for flow of air therethrough to the cylinders, means for supplying fuel to each barrel for admixture therein with the air, each barrel having a venturi therein, each venturi having a throat adjacent one end thereof constituting its entrance end, and a diffusion passage from the throat to its other end, the throats being eccentric in relation to said diffusion passages with the throats in the primary barrels offset in the direction toward said other end of the engine and the throats in the secondary barrels offset in the direction toward said one end of the engine.

9. In a system for supplying air/fuel mixture to the cylinders of a V-8 internal combustion engine, said system comprising an intake manifold for the engine, and a four-barrel carburetor having two primary barrels located side-by-side toward one end of the engine and two secondary barrels located side-by-side toward the other end of the engine and connected to the manifold for flow of air therethrough to the cylinders, means for supplying fuel to each barrel for admixture therein with the air, each barrel comprising a main venturi and a boost venturi for the main venturi, fuel being supplied to the boost venturi, each boost venturi having a throat adjacent one end thereof constituting its entrance end, and a diffusion passage from the throat to its other end, the throats being eccentric in relation to said diffusion passages with the throats in the primary boost venturis offset in the direction toward said other end of the engine and the throats in the secondary boost venturis offset in the direction toward said one end of the engine.

10. A carburetor for an internal combustion engine having a passage adapted for flow of air therethrough to the engine, said passage having a throat therein, and means for supplying fuel to said passage for admixture therein with the air, said throat being offset in relation to the outlet end of said passage for intensification of the richness of the mixture at that side of said passage toward which said throat is offset.

11. A carburetor for an internal combustion engine having a venturi structure adapted for flow of air therethrough to the engine, said venturi structure having a throat adjacent one end thereof and a diffusion passage from the throat to the other end thereof, and means for supplying fuel to said venturi structure for admixture therein with the air, said throat being offset in relation to said diffusion passage for intensification of the richness of the mixture at that side of said passage toward which said throat is offset.

12. A carburetor for an internal combustion engine having a main venturi and a boost venturi in the main venturi and adapted for flow of air through said venturis to the engine, said boost venturi having a throat adjacent the entrance end thereof and a diffusion passage from said throat to the other end thereof, means for supplying fuel to said boost venturi for admixture therein with air, said throat being offset in relation to said diffusion passage for intensification of the richness of the mixture at that side of said diffusion passage and main venturi toward which said throat is offset.

13. A carburetor as set forth in claim 12 wherein the diffusion passage is of conical form flaring outward toward said other end of said boost venturi.

14. A carburetor as set forth in claim 13 wherein the end structure of said diffusion passage adjacent to said throat is larger than said throat and forms an annular shoulder with said throat.

15. A carburetor as set forth in claim 14 wherein said means for supplying fuel to said boost venturi comprises a nozzle tube having an end portion extending into said diffusion passage adjacent the inner end thereof with the inner end of said tube adjacent said throat.

16. A carburetor as set forth in claim 15 wherein said inner end of said tube is spaced outwardly from said throat and wherein said boost venturi is provided with a hole through said shoulder adjacent to said inner end of said tube.

17. A carburetor for an internal combustion engine, means for forming a mixture conduit in said carburetor, means for supplying fuel to said mixture conduit including a fuel nozzle, and a venturi means in said mixture conduit comprising, a venturi diffuser section, a convergent venturi entrance section eccentric with respect to said diffuser section, and an overhanging annular shoulder at the throat of said venturi, said fuel nozzle having an outlet at said venturi throat partially shrouded by said overhanging annular shoulder.

18. A carburetor for an internal combustion engine having an air and fuel mixture conduit therethrough, a boost venturi structure positioned within said mixture conduit and coextensive therewith, means for supplying fuel to said boost venturi structure, said boost venturi structure having a restricted throat portion offset from a central axis of said mixture conduit for the enrichment of the fuel air mixture within said mixture conduit toward which said throat is offset.

19. A carburetor for an internal combustion engine having a tubular air and fuel mixture conduit therethrough, a boost venturi structure positioned within said mixture conduit and coextensive therewith, means for supplying fuel to said boost venturi structure, said boost venturi structure having a circular restricted throat portion eccentric to the axis of said tubular mixture conduit for the enrichment of the fuel air mixture within said mixture conduit toward which said throat is offset.

20. A carburetor for an internal combustion engine having a tubular air and fuel mixture conduit therethrough, a boost venturi structure positioned within said mixture conduit and coextensive therewith, means for supplying fuel to said boost venturi structure, said boost venturi structure having a circular restricted throat portion formed as a venturi and a diffusion passage extending from said throat portion, said restricted throat portion being eccentric to the axis of said mixture conduit for the enrichment of the fuel air mixture within said mixture conduit toward which said throat is offset.

References Cited in the file of this patent

UNITED STATES PATENTS

| | | |
|---|---|---|
| 2,323,442 | Beard | July 6, 1943 |
| 2,420,925 | Wirth | May 20, 1947 |
| 2,807,448 | Morton | Sept. 24, 1957 |
| 2,811,862 | Libby | Nov. 5, 1957 |